July 7, 1959 A. C. TRAVIS, JR 2,893,737

PORTABLE MAGNETIC SOUND RECORDERS

Filed Nov. 3, 1954 3 Sheets-Sheet 1

INVENTOR.
ALBERT C. TRAVIS JR.
BY Theodore Hafner
ATTORNEY

INVENTOR.
ALBERT C. TRAVIS JR.
BY Theodore [signature]
ATTORNEY

July 7, 1959 A. C. TRAVIS, JR 2,893,737

PORTABLE MAGNETIC SOUND RECORDERS

Filed Nov. 3, 1954 3 Sheets-Sheet 3

INVENTOR.
ALBERT C. TRAVIS JR.
BY Theodore [signature]
ATTORNEY 2,893,737

PORTABLE MAGNETIC SOUND RECORDERS

Albert C. Travis, Jr., Richmond Hill, N.Y.

Application November 3, 1954, Serial No. 468,453

3 Claims. (Cl. 274—4)

This invention relates to portable sound recorders especially of the magnetic type.

One of the objects of this invention is a portable sound recorder of extremely simple and rugged construction with a minimum of electrical and mechanical connections facilitating assembly and operation without affecting quality of sound recording and reproducing.

Another object of the invention is a portable magnetic sound recorder in which the movement of the motor and a transmission mechanism connected thereto is used substantially simultaneously to control mechanical winding and rewinding operations as well as corresponding electric switching operations.

A further object of the invention is to support the driving unit of a portable magnetic type sound recorder on a movable base and to utilize the base movement to cause coupling operations for connecting the motor in one position of the motor base with the tape drive so as to effect recording or listening as the case may be, and in another position of the motor base to connect the motor with the supply or take-up reel to effect rewinding.

Still another object of the invention is to support the driving motor and any gear coupled thereto on a movable base and mechanically to couple this base with one or more switching devices controlling the motor circuit and any other of the recording and/or reproducing circuits of the recorder so that under control of the motor movement not only the driving mechanism for the tape is operated in a desired manner but also the electric circuit or circuits contained in the recorder.

Still further an object of the invention is to support the driving unit on a rotatable or pivotable base and to use the base movement to realize mechanical couplings as well as electrical switch operations, and at the same time under control of the movement not only to decouple the tape from the pick-up device and to couple the tape to the pick-up device respectively, but also to couple and decouple respectively the driving mechanism with respect to take-up and take-off reels.

Still another object of the invention is to use a rocking movement of the motor base to couple and decouple the guiding wheel or roller for the sound carrier at the pick-up point from and to the driving mechanism and at the same time to couple and decouple respectively the take-up and take-off reels.

An additional object of the invention is to control from a rocking movement of the driving mechanism electrical switches as well as gear and belt couplings respectively.

A more specific object of the invention is to control additionally from the switch movement the movement of an erasing member, preferably of the permanent magnet type.

Still further an object of the invention is to control the movement of at least one of the switches in such a way that the operation of the switch will be limited in a predetermined position of the switch, for example to prevent erasing during re-winding.

Another object of the invention is to use the rocking movement of the motor unit to control several braking operations, respectively, at different instances.

In this connection it is a further specific object of the invention to provide a rotatable motor base of approximately T-shape, having two sides or ends coupled to control electrical switches and at the same time the operating position of the sound carrier, while a center portion of this base is used to control at least one brake, preferably two brakes exerting braking functions in different directions, one brake operative in horizontal direction and the other brake operative in vertical direction.

These and other objects of the invention will be more fully understood from the drawings annexed herewith in which.

Figure 1:
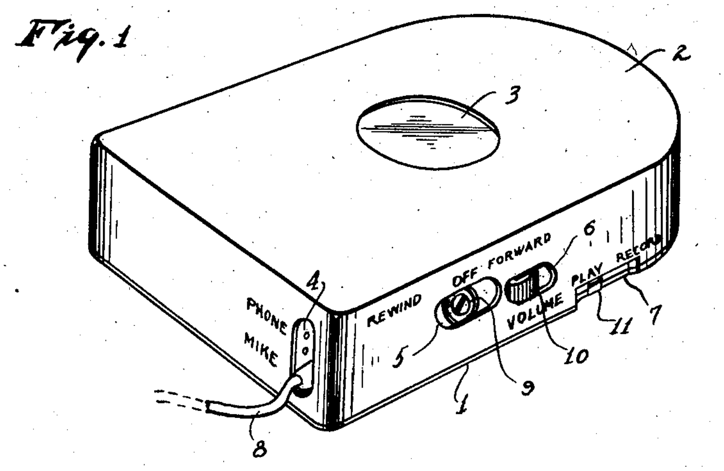
Fig. 1 represents a perspective view of a complete recording and reproducing device embodying certain features of the invention.

In Fig. 1 the portable recording and reproducing device consists of a frame 1 on which the mechanical and electrical elements of the device are supported in a manner which will be explained further below. Frame 1 is covered by a cylindrical cover plate 2 which, shows an inspection opening 3 and terminal openings 4, 5. 6 and 7 respectively.

Terminal opening 4 permits connection of the phone or any other translating device and at the same time connection of the microphone as indicated at 8.

Terminal opening 5 permits adjustment of the driving unit by means of a button 9 projecting therefrom, allowing the motor drive to be adjusted to three positions "rewind," "take-off," and "forward," respectively.

Terminal opening 6 through a knob 10 projecting therefrom permits adjustment of the sound volume.

Terminal opening 7 through lever end 11 projecting therefrom permits adjustment of the device to "playback" and "recording" positions respectively.

Figure 2:
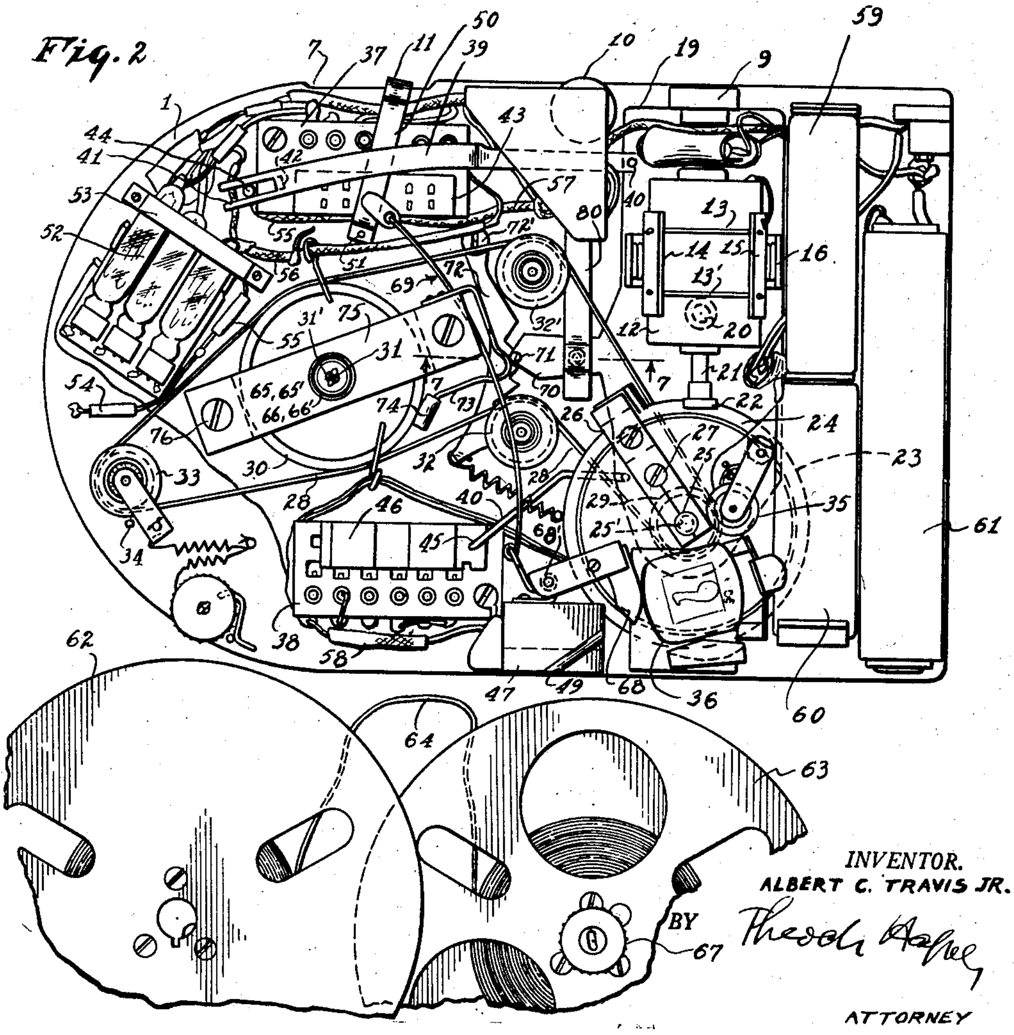
Fig. 2 represents an exploded top view of the interior of the device with the take-up and take-off reels removed and arranged on the side of the device, and the reels separated from each other.
Figures 3, 4, 5:
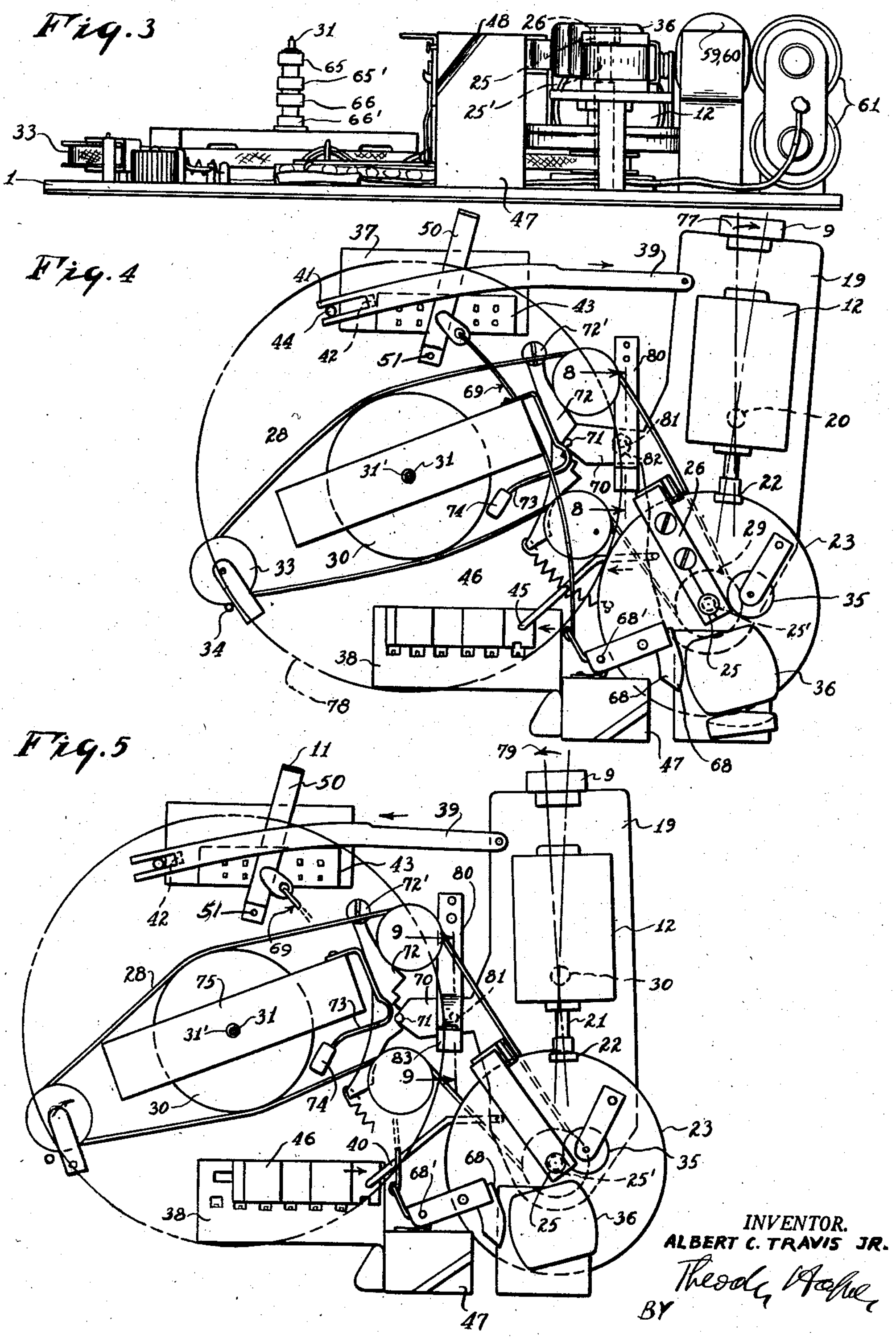
Fig. 3 represents a corresponding side view.
Figs. 4 and 5 represent certain parts of the driving mechanism in rewinding position and listening position respectively.

Figs. 2 and 3 represent top and side views respectively of a device such as shown in Fig. 1 with cover plate 2 removed and certain other parts such as take-up and take-off reels for a magnetic tape disengaged therefrom and shown in an exploded view.

In Figs. 2 and 3, frame 1 shows supported thereon a driving unit containing a motor 12 floatingly attached through spring wires 13, 13', side plates 14, 15 and hinge bracket 16 to base plate 19 which is mounted on frame 1 rotatable about shaft 20.

Thus by moving button 9 in one direction or another, motor 12 and all the elements connected or coupled thereto can be turned about axis 20 in one direction or another, thereby permitting the driving mechanism to be coupled to or decoupled from different parts of the recorder.

Motor 12 has a shaft 21 projecting therefrom and provided with small friction wheel 22 engaging the edge portion of a large friction wheel 23 which at this edge portion is provided with a rubber insert 24 to assure frictional contact between wheels 22 and 23.

This frictional contact is enhanced by the floating disposition of motor 12 through wires 13, 13', side plates 14, 15 and hinge bracket 16, which are designed to urge motor shaft 21 and friction wheel 22 continuously against rubber insert 24 and the preiphery of friction wheel 23.

Friction wheel 23 is also designed to serve as a flywheel to control the uniform movement of the tape or sound carrier.

Friction wheel 23 is rotatably mounted about a shaft 25 which in turn is supported at its lower end in base plate 19 and thereby will move simultaneously with the movement of motor 12 and the base plate 19 under control of button 9.

Shaft 25 supports in its portion projecting above friction wheel 23 a guiding member fixedly attached thereto and forming a guiding roller 25' for the magnetic tape.

The upper end of shaft 25 is supported on bracket 26 extending radially from shaft 25 to a point outside of friction wheel 23 and attached to base plate 19 in a manner not shown.

Radial bracket 26 has an adjustment screw 27 and is split at its central end to facilitate mounting, demounting and adjustment of the assembly.

Driving shaft 25 at its end projecting below friction wheel 23, is provided with another driving member in the form of a driving wheel 29, which in a predetermined position of base plate 19 will tension belt 28 and thereby drive belt wheel 30 and the reel shaft 31 coupled thereto in a manner permitting slippage.

Belt 28 is guided in its course from output wheel 29 to belt wheel 30 over guiding rollers 32', 32, and a tensioning roller 33, the movement of which is limited by stop member 34 projecting from frame 1.

Fig. 2 shows driving motor 12 and button 9 operating the driving mechanism supported on rotatable base plate 19 in neutral position.

In this neutral position the top or the tape guiding portion 25' of shaft 25 is out of engagement with pinch roller 35 which guides the recording tape toward and over magnetic head 36 as will be explained further below.

In addition to the driving unit 12 through 16 and 20 through 25, being supported through base plate 19 on frame 1, there are further supported on frame 1 a pair of multiple double throw switches 37, 38, which are also coupled to the movement of base plate 19 and which under control of button 9 serve to connect or disconnect the various circuit elements of the device in its different operating and non-operating positions.

Operation of switches 37 and 38 from base plate 19 is caused by a pair of levers 39, 40.

Lever 39 is in the form of a flat slightly curved bar pivotably attached to base plate 19 with one end terminating at its opposite end in a fork 41 which has an inner ridge or projection 42 bent out of the plane of lever 39 and therefore adapted to engage and move switch plate 43 of switch 37 thereby causing the desired or necessary connections or disconnections of electrical elements supported on frame 1 in an appropriate manner.

Fork 41 of flat lever 39 is guided in this movement by a bolt 44 attached to frame 1.

The other lever 40 controlling switch 38 is in the form of a longitudinal lever and is also rotatably attached to base plate 19 and controlling at 45 the movement of switch plate 46 of switch 38 thereby causing various electrical connections and disconnections resulting in desired recording, playback, rewinding and any other electrical or mechanical operations, as the case may be.

Next to magnetic head 36 there is arranged a guiding post 47 providing a guiding slot 49 for the magnetic tape. This guiding slot is arranged to extend in a plane forming an angle which is larger than 90 degrees with surface of frame 1.

Switch plate 43 in addition to being operable by projection 42 of flat lever 39 and under control of the movement of base plate 19, is also operable by the movement of switch lever 50 rotatable about axis 51 at one end thereof and projecting with its other end from opening 7 as also indicated in Fig. 1, at 11.

In addition to the mechanical and electrical elements described above and supported on frame 1, frame 1 also supports an amplifier structure schematically indicated in Fig. 2 at 52 and attached to frame 1 by bracket 53, and a number of circuit elements, some of which are schematically indicated at 54 and 55 respectively. All these circuit elements are interconnected and connected respectively to other elements of the device by means of cables and wires, some of which are schematically illustrated in Fig. 2 at 55, 56, 57 and 58.

The invention is of course not limited to any particular form, type or arrangement of circuits, circuit elements and circuit connections.

Power is supplied to these circuits and circuits elements by means of batteries, such as schematically shown in Fig. 2 at 59, 60 and 61, attached to and supported on frame 1.

As stated above, Fig. 2 represents a view of frame 1 with the take-up and take-off reels for the tape disengaged therefrom and shown in an exploded view position, removed from supporting shaft 31, at 63, 62 respectively.

Figure 10:
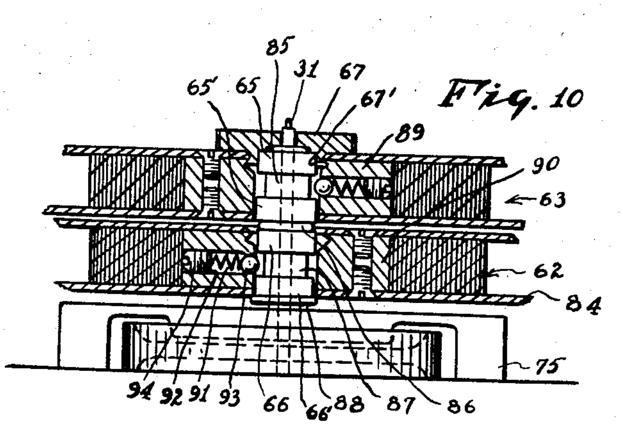
Fig. 10 represents the support of take-up and take-off reels in section.

In assembled position, take-up and take-off reels 63, 62 are interconnected by recording tape and are arranged one on top of the other supported on the same shaft 31 but on separate pairs of ball bearings 65, 65' and 66, 66', respectively, so as to be rotatable substantially independently from each other and only frictionally coupled to the common supporting shaft 31 and belt wheel 30 coupling thereto, as is illustrated in greater detail and at an enlarged scale in Fig. 10.

The driving torque is coupled to take-off and take-up reels 62, 63, after being assembled one above the other on their respective pairs of ball bearings 65, 65' and 66, 66' by an attachment screw 67 fitting in a thread 67' on the top of the hub opening of the upper reel which in the case illustrated in Fig. 10, is take-up reel 63. However, take-off reel 62 is provided with a similar thread and is of identical construction, to permit exchange of reels and recording of several sound tracks on the same tape.

In certain predetermined positions of base plate 19, and of the driving mechanism supported thereon, it will be necessary to decouple the erasing member usually provided in sound recorders of the magnetic type and such as is shown at 68. This is especially necessary in case of a rewinding operation.

In order to cause such decoupling of the erasing member under control of the movement of base plate 19, erasing magnet 68 is supported on frame 1 rotatable about axis 68' and is controlled in this rotation by the movement of switch lever 50.

For this purpose switch lever 50 and eraser 68 are intercoupled by a coupling wire 69.

Figure 6:
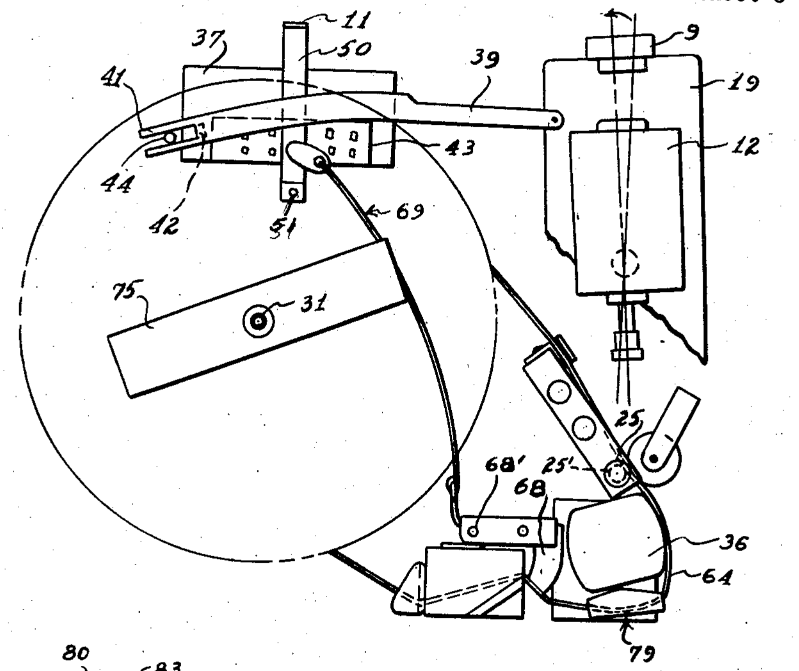
Fig. 6 represents certain parts of the driving mechanism in recording position.

Thus the erasing magnet 68 is permitted to be effective only in the recording position of lever 50, as for example shown in Fig. 6, and will be ineffective as for example shown in Fig. 2 in the playback position of switch lever 50.

At the same time, however, in the rewinding position of base plate 19 and of the driving mechanism supported thereon, switch lever 50 will be forced to stay in nonerasing position by the intercoupling between projection 42 of flat lever 39 with switch plate 43. In this position of flat lever 39, projection 42 will engage and prevent switch plate 43 and switch lever 50 coupled thereto, from being moved into recording or erasing position.

Rotatable base plate 19 is also provided with a central extension schematically indicated at 70 which serves to control various braking operations required in accordance with this invention.

As apparent from Fig. 2 extension 70 of base plate 19 has a pin 71 projecting therefrom and fitting into different grooves of a linear zig-zag spring member 72 attached to frame 1 at 72', depending on the different positions of adjustment of base plate 19 under control of button 9.

In the neutral position of base plate 9 shown in Fig. 2 pin 71 of extension 70 engages the central groove of detent cam 72, simultaneously pressing flat spring 73 and brake shoe 74, attached thereto at its free end, against drive wheel 30 and shaft 31.

The other end of spring mount 73 is attached to bracket 75 which supports reel shaft 31 and which in turn is supported in frame 1 by means of screws 76.

While Fig. 2 shows the driving mechanism in neutral position, Fig. 4, shows the driving mechanism in rewinding position with base plate 19 having been moved in the direction of arrow 77 and friction wheel 23 coupling directly to the lower rim of take-up reel 63 schematically shown in Fig. 4 at 78, thereby rewinding tape 64 at an increased speed.

At the same time flat lever 39 appears to be moved into a position where its downward projecting tab 42 engages switch plate 43 thereby preventing finger control tab 11 on switch lever 50 and eraser actuating wire 69 from being moved into erasing position.

Simultaneously with the movement of base plate 19, its extension 70 is also moved and control pin 71 arrives at the position shown in Fig. 4, engaging the first or top groove of positioning spring 72, thereby permitting spring mount 73 and brake shoe 74 to move back and out of engagement with belt wheel 30. In this way belt wheel 30, shaft 31, and reels 62 and 63 more or less loosely coupled thereto, are permitted to move relatively freely or unimpeded by belt 28.

At the same time as apparent from Fig. 4, belt 28 is slackened due to the inward movement of driving wheel 29 and under control of the movement of base plate 19 and control button 9. The slack thus occurring in belt 28 occurs in spite of tensioning roller 33 because said roller is restricted by stop 34.

In this connection it should be noted that the ball bearings on which the reels turn, are slipped over a hollow stationary post or tube 31', Fig. 2, which in turn is pressed into yoke 75, Fig. 5.

Shaft or rod 31, which is slightly smaller than the inside diameter of post 31', to permit it to turn freely, and which turns integral with wheel 30 extends upwards through the post 31' to impart rotation to the top or take up reel 63. Flat side portions on shaft 31 engage the corresponding slot of screw 67 to drive it. Rotation of screw 67 carries reel 63 with it.

Tubular post 31', in one particular embodiment of the invention has an outside diameter of 3/16", and an inside diameter of 3/32".

In accordance with another feature of the invention one of the reels is coupled to supporting post 31' more loosely than the other reel.

More specifically, in accordance with this invention take-off reel 62 is coupled more loosely to post 31' than take-up reel 63, so as to provide for recording or listening the necessary tension for tape 64 while it is being driven through the device and past its pick-up point.

Such differential coupling can be effected in different manners.

In accordance with a further feature of the invention take-off reel 62 is supported on a bearing or bearings which are more heavily greased than the bearing or bearings on which the take-up reel 63 is supported on post 31'.

In Fig. 5 the recording and reproducing apparatus of the device is shown in playback or listening position with base plate 19 being moved in the direction of arrow 79 into a position where the top or guiding portion 25' of driving shaft 25 presses the tape 64 against pinch roller 35, thereby driving the tape at a predetermined speed past the pickup position provided on magnetic head 36.

Simultaneously with the movement of base plate 19, extension 70 and pin 71 move to engage the last of bottom grooves of positioning spring 72, thereby keeping spring 73 and brake shoe 74 supported thereon out of engagement with belt wheel 30 in a manner similar to that indicated in Fig. 4.

Further simultaneously with the movement of base plate 19 switch levers 39 and 40 are operated in opposite directions. Switch lever 39 with projection 42 is moved forward, thereby permitting switch plate 43 and its control lever 50 to be moved into recording position if desired. Switch lever 40, on the other hand, also under control of base plate 19 is moved backward and in a direction opposite to that of switchlever 39, thereby moving switch plate 46, and causing the desired connections and disconnections of switch 38.

Fig. 6 represents the driving mechanism in recording position with base plate 19 and all elements controlled thereby, being in substantially the same position as shown in Fig. 5, and switchlever 50 being moved into recording position. In this position of switchlever 50 erasing head 69 is operative and in contact with recording tape 64, thereby causing erasure of any sound recorded on the tape prior to its reaching magnetic head 36.

In addition to brake mechanism 73, 74, operated by central extension 70, 71 of base plate 19 under control of its movement by outside button 9 as indicated in Figs. 2, 4, 5, and 6, there is a second brake mechanism supported on base plate 1. The second brake mechanism operates in a direction substantially perpendicular to the direction of operation of brake 73, 74, i.e., in a direction perpendicular to the movement of base plate 19. This braking mechanism is indicated in Figs. 4 and 5 in the form of a flat, supporting spring 80, attached to frame 1, as more clearly apparent froms Figs. 7, 8, and 9, where Fig. 7 shows a cross section through Fig. 2 along lines 7—7 and Figs. 8 and 9 cross sections through Figs. 4 and 5 along lines 8—8 and 9—9 respectively.

Figure 7:
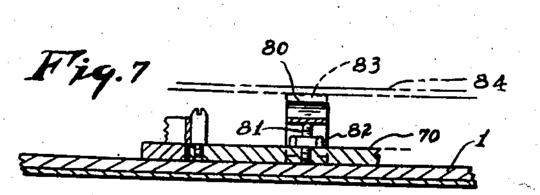
Fig. 7 is a sectional view of certain brake elements in operative position, taken along lines 7—7 of Fig. 2.
Figure 8:
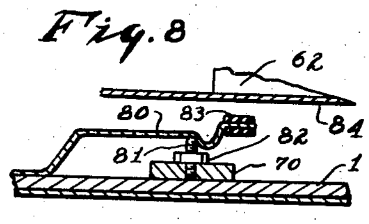
Fig. 8 is a sectional view of these brake elements in rewinding or in-operative position taken along lines 8—8 of Fig. 4.
Figure 9:
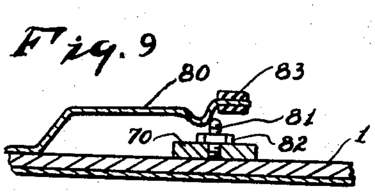
Fig. 9 represents a sectional view of these brake elements in listening or also in-operative position taken along lines 9—9 of Fig. 5.

Now referring to Figs. 7, 8, and 9, extension 70 is provided at a central portion thereof with an adjustment bolt 81 (see also Figs. 4 and 5) the height of which is made additionally and fixably adjustable by means of a nut member 82.

More specifically Fig. 7 represents extension 70 in a position, where supporting spring 80 and brake shoe 83 is pushed by pin 81 againt an edge portion of bottom flange 84 of the lower or take-up reel 63 so as to effect immediate stoppage of take-up reel 63 and prevent unwinding of tape 64 as soon as base plate 19 is shifted into its neutral position corresponding to that shown in Fig. 2.

In Fig. 4 and in case of playback or listening, the movement of extension 70 of base plate 19 under control of control button 9 will cause bolt 81 to move into the position shown in Fig. 8, thereby causing disengagement of brake shoe 83 from bottom plate 84 of take-up reel 62.

Similarly in recording position such as shown in Fig. 5 movement of extension 70 will move control bolt in 81 into the position shown in Fig. 9, thereby maintaining brake shoe 83 in its lower position and out of engagement with bottom plate 84 of take-up reel 62.

Fig. 10 at an enlarged scale shows the independent rotational support of take-up and take-off reels 62 and 63 on common post 31' by means of two pairs of ball bearings 65, 65' and 66, 66' respectively which are arranged spaced by spacing rings 85, 86, 87 and 88 respectively.

By removing holding screw 67, take-up and take-off reels 63, 62 can be interchanged for any purpose such as the recording of a second sound track and along another edge of the tape 64. The holding screw must, of course, be installed on the other reel.

The two pairs of ball bearings 65, 65' and 66, 66' respectively are separated by spacers 85 and 87, which permit axial fixation of the take-up and take-off reels 62, 63 respectively.

In accordance with another feature of the invention, fixation is caused by means of a spring detent mechanism provided in the hubs or cores of 89, 90 of reels 62, 63 respectively.

Such detent mechanism is shown to consist of a spring 91, provided in a radial opening 92 of hubs 89, 90 and pressing against a steel ball 93, projecting from opening 92 and fitting into the space between ball bearings 65 and 65' and ball bearings 66 and 66', respectively.

Screw 94 serves to close opening 92 and also to adjust the tension of detent spring 91.

In this way it is possible to mount and slip each of reels 62 and 63 over its associated pair of ball bearings and to couple reels 62 and 63 in predetermined positions, without however affecting their removability.

In order to remove reels 62 and 63 from shaft 31 it is only necessary to force the reel 62, 63 in axial direction upward until steel balls 93 will give away against the pressure of springs 91.

As stated before, the different pairs of ball bearings 65, 65' and 66, 66' are differently greased in order to impart tension to tape 64 on its course from the take-off to take-up reel. More specifically, the ball bearings 66, 66' are provided with a heavier grease than ball bearings 65, 65', thereby impeding or reducing the rotation of take-off reel 62.

The invention is not limited to type, form and construction of record carrier, take-up and take-off mechanism, recording and reproducing mechanism, driving and switching devices and to any of the other electrical and mechanical elements shown and described, but may be applied in any form or manner whatsoever without departing from the scope of this disclosure.

I claim:

1. In a portable device for magnetically recording sound on a linear sound carrier, a frame, take-up and take-off reels supported on said frame stacked upon each other for independent rotation about a common axis, a base plate of elongated shape and rotatably supported on said frame near one end thereof about an axis parallel to said common reel axis, a driving motor supported on said base plate, and said base plate also havtng an extension intermediate its ends; there being also supported on said frame, reel braking means operated by said extension of said base plate so as to control said braking means selectively in predetermined positions of said base plate, a speed reduction mechanism coupled to said driving motor and also supported on said base plate between said motor and said output wheel, and guiding means for said sound carrier supported on said frame; said speed reduction mechanism including means for driving said take-up reel in one position of said base plate, and further including a sound carrier engaging wheel and a reel engaging wheel coaxially arranged one above the other; the other end of said base plate being used to support said sound carrier and reel engaging wheels; said sound carrier engaging wheel being arranged upon movement of said base plate in said one position to press said sound carrier against said guiding means to permit said sound carrier to be driven by said sound carrier wheel; and in another position of said base plate to be disengaged from said guiding means, thereby preventing said guiding means to press said sound carrier into driving contact with said sound carrier engaging wheel; and said reel engaging wheel being arranged upon movement of said base plate in said other position to be moved into driving engagement with said take-off reel, and in said first position of said base plate to be moved out of driving engagement with said take-off reel.

2. In a portable device for magnetically recording sound on a linear sound carrier, a frame, take-up and take-off reels supported on said frame stacked upon each other for independent rotation about a common axis, a base plate supported on said frame about an axis parallel to said common reel axis, a driving motor supported on said base plate, a speed reduction mechanism coupled to said driving motor and also supported on said base plate, and guiding means for said sound carrier supported on said frame; means including a belt for coupling said reduction mechanism to said take-up reel, and means including a friction wheel for coupling said reduction mechanism to said take-off wheel, both said coupling means being operative under control of and in different positions of said base plate, said speed reduction mechanism including means for driving said take-up reel in one position of said base plate, and further including a sound carrier engaging wheel and a reel engaging wheel coaxially arranged one above the other; said sound carrier engaging wheel being arranged upon movement of said base plate in said one position to press said sound carrier against said guiding means to permit said sound carrier to be driven by said sound carrier wheel; and in another position of said base plate to be disengaged from said guiding means, thereby preventing said guiding means to press said sound carrier into driving contact with said sound carrier engaging wheel; and said reel engaging wheel being arranged upon movement of said base plate in said other position to be moved into driving engagement with said take-off reel, and in said first position of said base plate to be moved out of driving engagement with said take-off reel, braking means supported on said frame and operable on said take-up reel, and means supported on said base plate for operating said braking means in said other positions of said base plate.

3. Device according to claim 2 wherein said friction coupling means include a friction roller on the shaft of said driving motor and frictionally engaging the periphery of said friction wheel, the latter being arranged rotatable about an axis substantially parallel to the said axis of said take-up and take-off reels, and being also arranged to extend in substantially the same plane as the plane of one of the rims of said take-off wheel and in such a position with respect to said rim that said friction wheel will engage and disengage, respectively, said take-off rim in different predetermined positions of said friction wheel and of the base plate supporting said friction wheel.

References Cited in the file of this patent

UNITED STATES PATENTS

| | | |
|---|---|---|
| 1,789,607 | Steurer | Jan. 20, 1931 |
| 2,537,260 | Dale | Jan. 9, 1951 |
| 2,555,643 | Harrison | June 5, 1951 |
| 2,639,333 | Howell | May 19, 1953 |
| 2,713,618 | McNabb | July 19, 1955 |
| 2,719,884 | Reed | Oct. 4, 1955 |
| 2,732,144 | Jones | Jan. 24, 1956 |